United States Patent
Baseman et al.

(10) Patent No.: US 11,022,965 B2
(45) Date of Patent: *Jun. 1, 2021

(54) CONTROLLING MULTI-STAGE MANUFACTURING PROCESS BASED ON INTERNET OF THINGS (IOT) SENSORS AND COGNITIVE RULE INDUCTION

(71) Applicant: International Business Machines Corporation, Armonk, NY (US)

(72) Inventors: Robert J. Baseman, Brewster, NY (US); Jayant R. Kalagnanam, Briarcliff Manor, NY (US); Young M. Lee, Old Westbury, NY (US); Jie Ma, Nanjing (CN); Jian Wang, Beijing (CN); Guan Qun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/389,083

(22) Filed: Apr. 19, 2019

(65) Prior Publication Data

US 2019/0243346 A1  Aug. 8, 2019

Related U.S. Application Data

(63) Continuation of application No. 15/484,327, filed on Apr. 11, 2017, now Pat. No. 10,365,640.

(51) Int. Cl.
*G05B 19/418* (2006.01)
*G05B 13/02* (2006.01)

(52) U.S. Cl.
CPC ..... *G05B 19/4188* (2013.01); *G05B 13/0265* (2013.01); *G05B 19/41875* (2013.01);
(Continued)

(58) Field of Classification Search
CPC .......... G05B 13/0265; G05B 19/41875; G05B 19/4188; G05B 2219/32186;
(Continued)

(56) References Cited

U.S. PATENT DOCUMENTS

| 5,009,396 A | 4/1991 | den Hartog et al. |
| 5,111,531 A | 5/1992 | Grayson et al. |

(Continued)

FOREIGN PATENT DOCUMENTS

| CN | 203134125 U | 8/2013 |
| CN | 203465576 U | 3/2014 |

(Continued)

OTHER PUBLICATIONS

Shi, J., et al., "Quality control and improvement for multi-stage systems: a survey", IIE Transactions (2009), Accepted Apr. 2009, pp. 744-753, vol. 41.

(Continued)

*Primary Examiner* — Yuhui R Pan
(74) *Attorney, Agent, or Firm* — Scully, Scott, Murphy & Presser, P.C.; Daniel P. Morris (57) ABSTRACT

Controlling product production in multi-stage manufacturing process automatically generates by machine learning causal relationships between the processing conditions and the product quality based on product genealogy data and product quality data. Real time sensor data from sensors coupled to processing units in a manufacturing facility implementing the multi-stage manufacturing process are received, and control rules are instantiated based on the real time sensor data. An instantiated control rule firing causes an actuator to automatically set a processing variable to a set point specified in the control rule.

20 Claims, 9 Drawing Sheets

(52) U.S. Cl.
CPC .............. *G05B 2219/32186* (2013.01); *G05B 2219/33034* (2013.01); *G05B 2219/42001* (2013.01); *Y02P 90/02* (2015.11)

(58) Field of Classification Search
CPC .......... G05B 2219/33034; G05B 2219/42001; Y02P 90/02
See application file for complete search history.

(56) References Cited

U.S. PATENT DOCUMENTS

| | | |
|---|---|---|
| 2010/0010902 A1 | 1/2010 | Casey |
| 2011/0184545 A1 | 7/2011 | Rouge et al. |
| 2011/0251868 A1 | 10/2011 | Mikurak |
| 2015/0199775 A1 | 7/2015 | Pfeiffer et al. |
| 2016/0192619 A1 | 7/2016 | Gibbs |
| 2016/0195602 A1 | 7/2016 | Meadow |
| 2016/0248847 A1 | 8/2016 | Saxena et al. |

FOREIGN PATENT DOCUMENTS

| | | |
|---|---|---|
| EP | 2392446 A1 | 12/2011 |
| EP | 2494415 A1 | 9/2012 |
| WO | 2012/000649 A1 | 1/2012 |
| WO | 2015/135043 A1 | 9/2015 |

OTHER PUBLICATIONS

Pang, J., "Intelligent Modeling and Decision Making for Product Quality of Manufacturing System Based on Fuzzy Cognitive Map", IJCSI International Journal of Computer Science Issues, Jan. 2013, pp. 501-506, vol. 10, Issue 1, No. 2.

Fleischmann, M., et al., "Controlling inventories with stochastic item returns: A basic model", European Journal of Operational Research, Apr. 2002, pp. 63-75, vol. 138, Issue 1.

List of IBM Patents or Patent Applications Treated as Related, dated Apr. 19, 2019, 2 pages.

Office Action dated Jul. 12, 2019 received in U.S. Appl. No. 15/806,591, 20 pages.

CONTROLLING MULTI-STAGE MANUFACTURING PROCESS BASED ON INTERNET OF THINGS (IOT) SENSORS AND COGNITIVE RULE INDUCTION

FIELD

The present application relates generally to computers and computer applications, and more particularly to multi-stage manufacturing process and controlling the same.

BACKGROUND

In many manufacturing processes that involve multiple processing steps or stages such as in steel manufacturing and chemical products manufacture, the quality of a product that is manufactured is only discovered at the end of the manufacturing process. The product quality such as the degree of defect, however, is often influenced by processing conditions during upstream or early processing stages. Despite those processing conditions which may be present during the upstream processing stages, there is no easy way of uncovering early indicators that could remediate the product quality problems.

Known quality control methods may apply a conventional process quality control system to a processing stage with pre-determined control bounds, which operates on each processing stage independently. An example of a conventional process quality control system is statistical process control (SPC). Integrating independent operations of different processing stages in identifying product quality indicators or product quality control mechanisms has been a challenge in multi-stage manufacturing processes.

BRIEF SUMMARY

A system and method of controlling product production in multi-stage manufacturing process may be provided. The system in one aspect may include a hardware processor communicatively coupled to a storage device storing product genealogy data. The product genealogy data may include a history of processing conditions at all stages in the multi-stage manufacturing process in manufacturing a product. The processing conditions may be expressed in terms of process variables and corresponding values measured by sensors coupled to processing units in a manufacturing facility implementing the multi-stage manufacturing process. The hardware processor receives the product genealogy data, for example, from a database storing such genealogy data. The hardware processor may select a subset of process variables that influence product quality, from the process variables. The hardware processor may execute a machine learning algorithm with the product genealogy data and the subset of process variables as input, for the machine learning algorithm to learn causal relationships between the processing conditions and the product quality. The hardware processor may automatically generate control rules based on the causal relationships, the control rules for controlling process variable set points at one or more stages in the multi-stage manufacturing process. The hardware processor may receive real time sensor data from the sensors and instantiate one or more of the control rules based on the real time sensor data, wherein a control rule is fired responsive to the real time sensor data meeting a conditional part of the control rule. Responsive to the control rule firing, the hardware processor controls an actuator coupled to one or more of the processing units to set a processing variable to a set point specified in the control rule.

A method of controlling product production in multi-stage manufacturing process, in one aspect, may include receiving product genealogy data comprising a history of processing conditions at all stages in the multi-stage manufacturing process in manufacturing a product, the processing conditions expressed in terms of process variables and corresponding values measured by sensors coupled to processing units in a manufacturing facility implementing the multi-stage manufacturing process. The method may also include selecting a subset of process variables that influence product quality, from the process variables. The method may further include executing a machine learning algorithm with the product genealogy data and the subset of process variables as input, the machine learning algorithm learning causal relationships between the processing conditions and the product quality. The method may further include automatically generating control rules based on the causal relationships, the control rules for controlling process variable set points at one or more stages in the multi-stage manufacturing process. The method may also include receiving real time sensor data from the sensors. The method may further include instantiating one or more of the control rules based on the real time sensor data, wherein a control rule is fired responsive to the real time sensor data meeting a conditional part of the control rule. The method may also include, responsive to the control rule firing, controlling an actuator coupled to one or more of the processing units to set a processing variable to a set point specified in the control rule.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1C-1, FIG. 1C-2, and FIG. 1C-3 show outputs generated from control rule learning in one embodiment of the present disclosure.

DETAILED DESCRIPTION

A system, method and techniques may be provided for controlling multi-stage manufacturing process based on Internet of Things (IoT) sensors and cognitive rule induction. An aspect of the system and method may include selecting features of processing conditions during production stages that influence product quality, for example, expressed as p1.s1.v2 (product1, stage1, variable2), p1.s2.v1 (product1, stage2, variable1), and p1.s3.v5 (product1, stage3, variable5). Another aspect of the system and method may include using genealogy data and the process variables (also referred as features), which are recorded process conditions measured (or recorded) by sensors, selected to train or learn various tree induction algorithms (for example, decision tree algorithms such as CART (Classification and Regression Tree), ID2 (Iterative Dichotomiser 2), C5.0 and Random Forest), evaluating the accuracy of the algorithms and identifying one or more most accurate algorithms. Yet another aspect of the system and method may include generating feedback rules and feed forward rules that set a controllable processing set point (processing condition) of a stage of a manufacturing process so that desired product quality is obtained.

The system and method in one embodiment automate learning of feedback and feed forward control rules for IoT-based product quality control in multi-stage manufacturing process utilizing both real time data (for example, streaming data from all devices and/or sensors from all stages of a manufacturing process) and historic product genealogy data.

Accessing all the process variable data from all the processing stages in a multi-stage manufacturing process in real time and learning a causal relationship between the process variables (or processing conditions) from different stages and product quality present a challenge in manufacturing industry. Deriving a process control method (for example, including feed forward and feedback analytics) that obtains desired product quality in real time has not been easy. IoT (Internet of Things) is a technological foundation that can provide connectivity and real time messaging of sensor data detected by and distributed from many sensors, devices, equipment and unit operations (stages) across a whole manufacturing or production process. The system and method in the present disclosure in one embodiment utilize IoT (for example, IoT sensor detected data) in developing a process quality control method for real-time product quality improvement.

The system and method described in the present disclosure in one embodiment automatically learn feedback and feed forward control rules that define causal relationship between processing conditions and product quality, generating product quality control rules, for example, based on IoT detected real-time data (streaming data from all the devices/sensors from all the stages of process) and historic product genealogy data, to control product quality in a multi-stage manufacturing process.

In one embodiment, features or process variables in production stages that influence the product quality are selected for induction of cognitive rules. Genealogy data and the process variables selected are input to a machine learning algorithm to learn a causal relationship between the processing conditions of all the production stages and product quality. Examples of a machine learning algorithm may include but are not limited to, decision tree algorithms such as CART (Classification and Regression Tree), ID2 (Iterative Dichotomiser 2), C5.0 and Random Forest algorithms.

In one embodiment, quality control rules (for example, feedback and feed forward rules) that set a controllable processing set point of a stage (processing condition at a stage), for different stages in a multi-stage manufacturing process, are generated. The effectiveness of the quality control rules is learned and the most effective rules are identified. For example, n-number of rules having the highest effectiveness measure may be identified.

In one aspect, the quality control rules are instantiated in real time using both real time data (streaming data from all the devices/sensors from all the stages of process) and historic product genealogy data. The control action (for example, feedback or feed forward action), determined according to the identified n-number of the quality control rules, is sent to a process controller, a process advisory system, and/or an actuator, which implements the control action. The effectiveness of the control actions after the process controller, the process advisory system, and/or the actuator implements the control action, is measured and stored in as product genealogy data, which then may be used in learning the quality control rules.

Figure 1A:
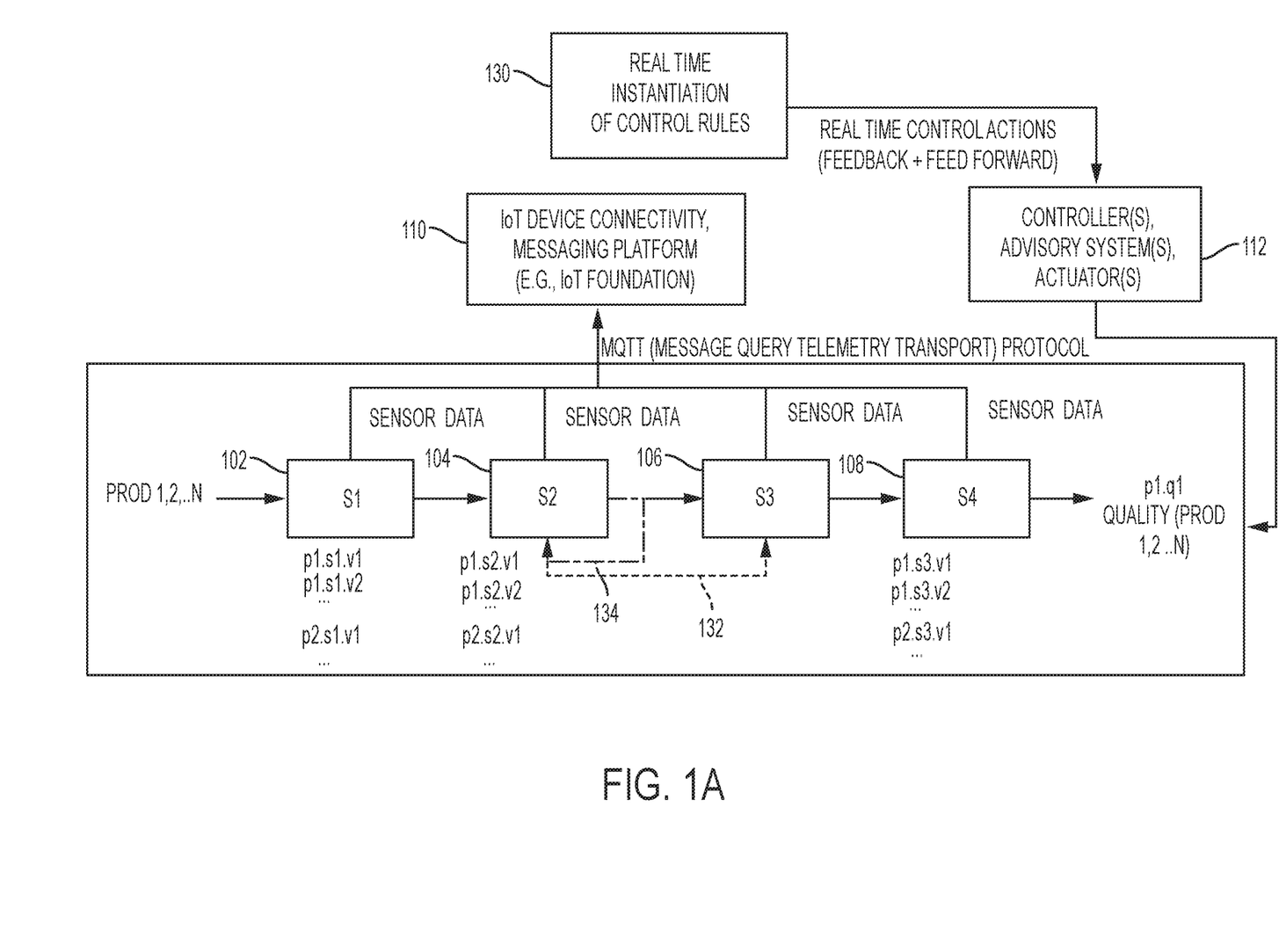
FIG. 1A shows an example product manufacturing flow in one embodiment of the present disclosure.
Figure 1B:
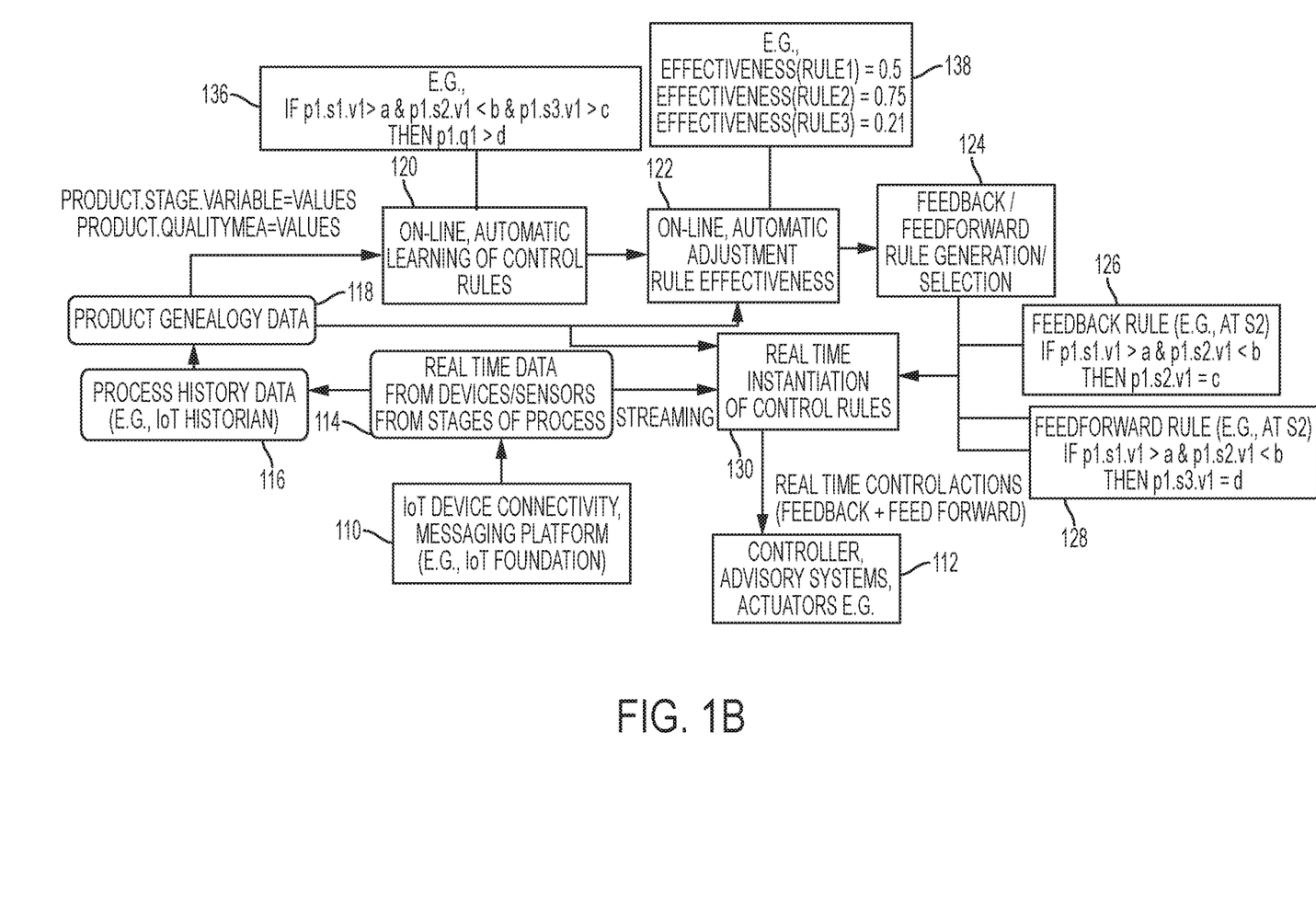
FIG. 1B shows control rule induction process and manufacture control process in one embodiment of the present disclosure.
Figure 1C:
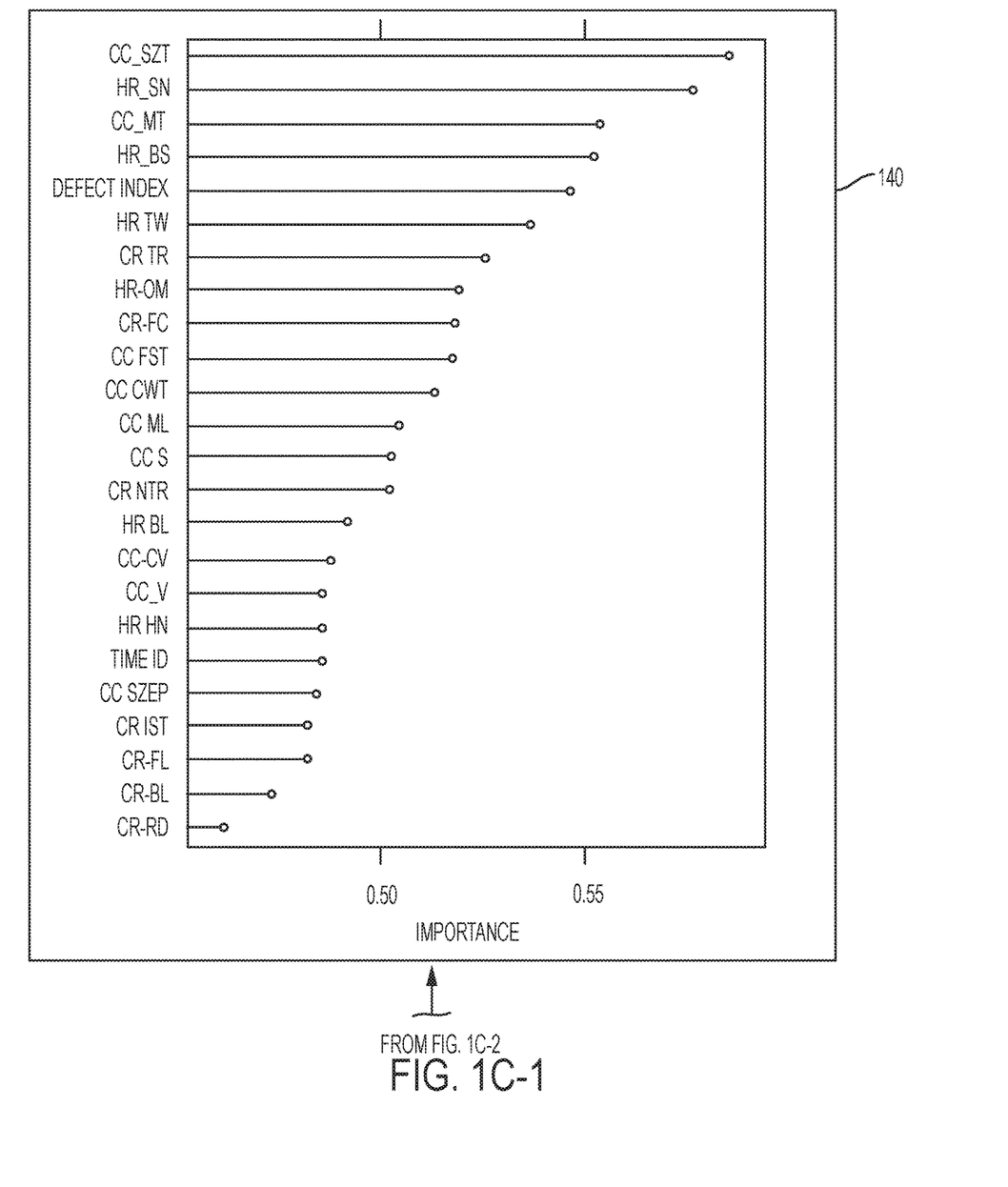
Figure 1C:
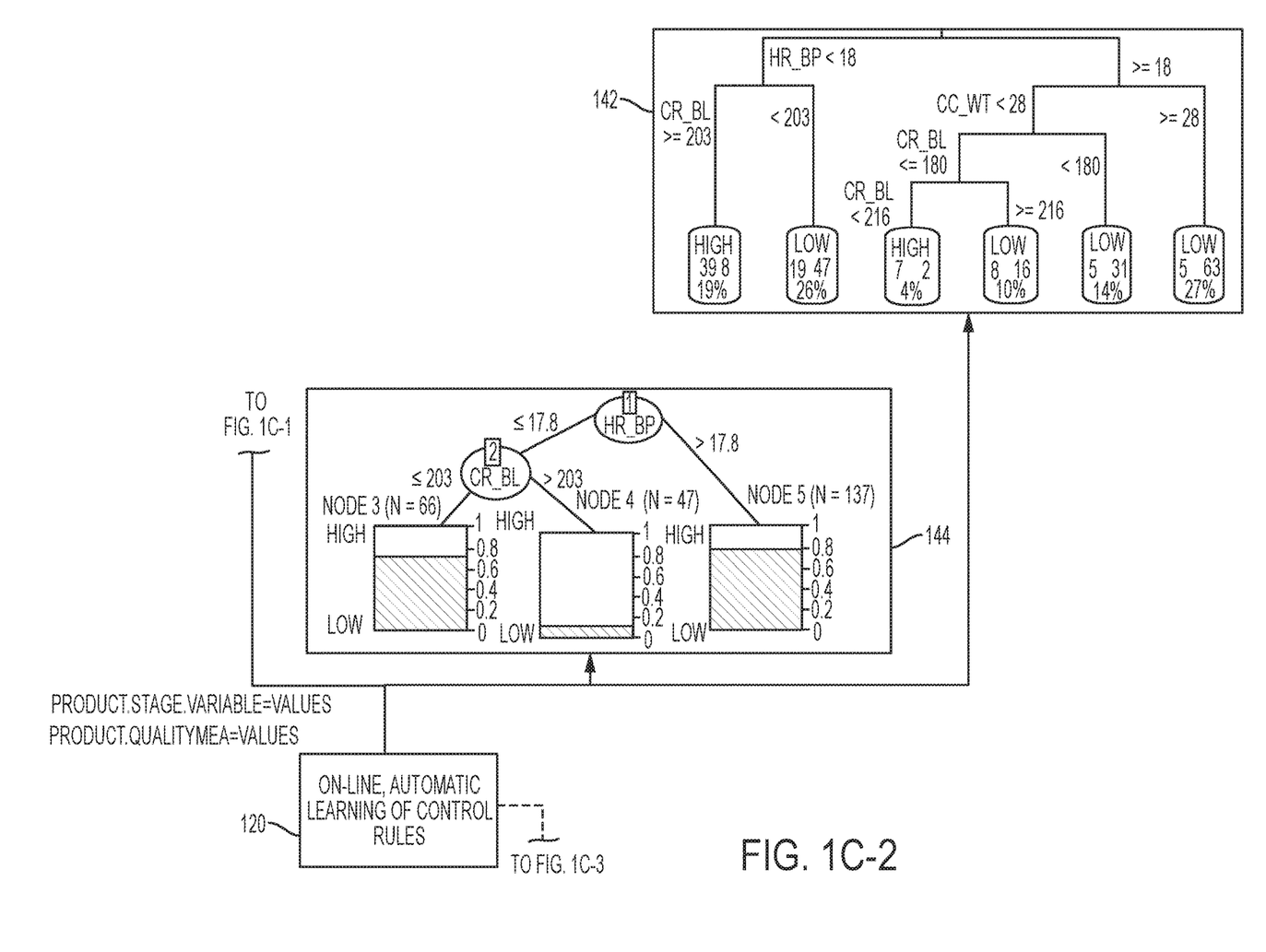
Figure 1C:
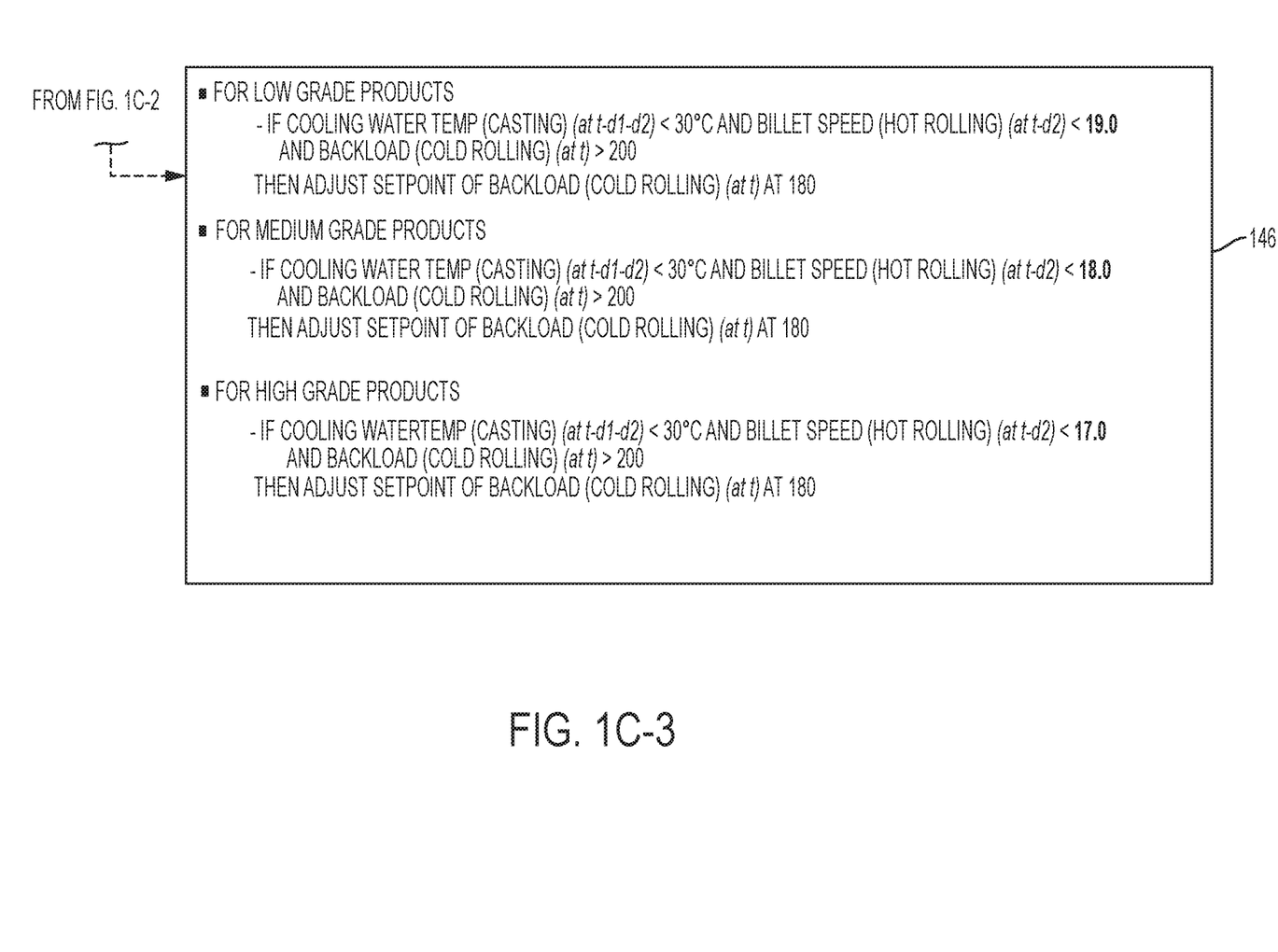

FIG. 1A, FIG. 1B, FIG. 1C-1, FIG. 1C-2, and FIG. 1C-3 illustrate a method of the present disclosure in one embodiment. FIG. 1A shows in one embodiment a product manufacturing flow. FIG. 1B shows control rule induction process and manufacture control process in one embodiment of the present disclosure. FIG. 1C-1, FIG. 1C-2, and FIG. 1C-3 show outputs generated from control rule learning in one embodiment of the present disclosure.

Referring to FIG. 1A, consider an example in which a multi-stage manufacturing process includes stages S1 (102), S2 (104), S3 (106) and S4 (108) through which material passes through to become an end product. Note multi-stage manufacturing processes may have different number of stages, for example, 1 through M. FIG. 1A shows four stages as an example for simplicity. At each stage, the material is acted on to produce an intermediary product. The last stage in the manufacturing process produces the end product. For instance, FIG. 1A shows, as example, material for products identified as identified as Product 1, Product 2, . . . Product N) entering stage 1 (102), and is acted on with one or more operating conditions. An operating condition z for a product x at a stage y is expressed as px.sy.vz. For instance, Product 1 at Stage 1 with operating condition 1 is expressed as p1.s1.v1; Product 1 at Stage 1 with operating condition 2 is expressed as p1.s1.v2; Product 2 at Stage 1 with operating condition 1 is expressed as p2.s1.v1. Similarly, as an example, Product 1 at Stage 2 with operating condition 1 is expressed as p1.s2.v1; Product 1 at Stage 2 with operating condition 2 is expressed as p1.s2.v2; Product 2 at Stage 2 with operating condition 1 is expressed as p2.s2.v1. Likewise, as an example, Product 1 at Stage 3 with operating condition 1 is expressed as p1.s3.v1; Product 1 at Stage 3 with operating condition 2 is expressed as p1.s3.v2; Product 2 at Stage 3 with operating condition 1 is expressed as p2.s3.v1. A quality measure of a product may be expressed as p1.q1, p1.q2, . . . p1.qx, with q1 being a quality attribute. Take for example, steel manufacturing, and steel as an example product, examples of quality attributes may include, but are not limited to surface smoothness, content purity, carbon content, and strength of steel that is manufactured.

Each stage acts on the raw material or intermediary material or product that passes through it, under its operating conditions. Operating conditions are also referred to as processing conditions or features. Examples of operating conditions include but are not limited to, temperature, pressure, flow rate, chemical content of material.

Referring to FIG. 1A, material (e.g., raw material) for manufacturing Product 1, for example enters Stage 1 (102) and is acted on with operating condition 1 (expressed as p1.s1.v1), and results in an intermediary product. That intermediary product enters Stage 2 (104) and is acted on with operating condition 1 and operating condition 2 in that stage (expressed as p1.s2.v1 and p1.s2.v2). Stage 2 produces a second intermediary product. That second intermediary product enters Stage 3 (106) is acted on with one or more operating conditions, resulting in a third intermediary product, and so forth. The third intermediary product enters Stage 4 (108) and is processed at Stage 4, under the operating conditions there, and the end product, Product 1 is produced. The different operating conditions at the stages (e.g., 102, 104, 106, 108) of the manufacturing affect how the end product is manufactured and the quality of the end product.

In one embodiment, each of the area of the manufacturing stages (102, 104, 106, 108) is equipped with sensors or like devices that measure the operating conditions in real-time. The sensors, for example, are IoT sensors or devices. The sensors are connected (e.g., wirelessly or wired) to an IoT device connectivity, message platform 110, a hardware platform that may control connection and collection of data from IoT sensors. An example of such platform may include the IoT Foundation™ from International Business Machines Corporation (IBM®), in Armonk, N.Y. A protocol such as the Message Query Telemetry Transport (MQTT) protocol may be used to communicate or receive sensor detected data from the manufacturing stages (102, 104, 106, 108). Examples of IoT sensors may include, but are not limited to, thermocouple (which measures temperature), pressure gauge, material flow rate meter, and luminance meter. For instance, via the IoT device connectivity, message platform 110, the IoT sensors at the stages may be controlled to detect and transmit sensor data at specified time intervals. The IoT device connectivity, message platform 110 can specify or map which sensors at which stages the measured data should be sent at what time interval. In one embodiment, the measured (also called detected) and transmitted sensor data is real time data that the sensors at respective stages detected at the specified time interval.

The area of the stages (or equipment, processing unit or container within which the material is processed) are also connected to a controller, an advisory system, or one or more actuators 112 (e.g., referred to as a controller) that automatically control, actuate or implement an operating condition under which the material or intermediary product is operated. The controller 112 may send signals to the processing equipment or unit to set the operating conditions of the stages or in the area of the stages.

Referring to FIG. 1B, at 114, sensor data from the manufacturing stages are received via the IoT device connectivity, message platform 110. For instance, a database system at 114 may receive and store real time data from sensors or devices (e.g., all sensors) at stages (e.g., all stages) of a manufacturing process. The database system at 114 may store the real time data in the format of product, stage, operating condition tuple as described above. In addition, the real time data also include the end product quality data, for example, which may be measured by an instrument that measures the product quality such as the surface smoothness, purity, carbon content, strength (e.g., of steel in steel manufacturing). The database system at 114 may transmit the real time data to a historian database system 116. In one embodiment, the database system at 114 may store or keep real time data of a defined period, for example, most recent past 1 hour or 1 day or another time period received from the IoT device connectivity, message platform 110.

At 116, history data is processed. For example, the historian database system accumulates measurement data with time stamp for each measurement data received from the database system at 114, and stores the measurement data as historical data, for example, for long term storage.

At 118, product genealogy data is generated or retrieved. Product genealogy data specifies the stages and operating conditions a product was processed through and the product qualify produced at the end of the stages.

At 120, on-line, automatic learning of control rules takes place, for example, by executing a machine learning algorithm. Inputs to the machine learning algorithm include the product genealogy data and features (processing conditions or operating conditions) that are selected for training a machine learning model. An example of a machine learning algorithm is a decision tree algorithm. Example of a learned rule is shown at 136, which includes "If p1.s1.v1>a & p1.s2.v1<b & p1.s3.v1>c Then p1.q1>d." Example outputs of the machine learning algorithm are shown in FIG. 1C-1, FIG. 1C-2, and FIG. 1C-3. The machine learning model that is learned is run to produce control rules. A machine learning model has a mathematical expression of predicting a response variable (also called dependent variable) in terms of state variables (also called independent variables) and coefficients for state variables. The learning of machine learning model is to compute the coefficients using the historic data (also called trained data).

At 122, the control rules output by the machine learning model are ranked by their effectiveness. Example effectiveness measures are shown at 138. For instance, the effectiveness of the control rules are measured by the quality of the product that is produced when using those rules. The effectiveness of a control rule may be determined by producing a product via the manufacturing stages, applying the control rule during the manufacturing stages of the product, and measuring the quality of the end product produced based on applying the control rule. In one aspect, one or more control rules may be applied during the manufacturing of the product, and the effectiveness may be measured for the one or more control rules together based on the end product produced by applying those one or more control rules.

An example computation for determining the effectiveness of control rule(s) may include:

$$E_i = E_{i,0} + (1 - E_{i,0}) \times (\text{Defect}_{avg} - \text{Defect}_i) / \text{Defect}_{avg}, \text{ (for rule i)}$$

where $E_i$=new effectiveness of rule i, $E_{i,0}$=effectiveness of rule i before the rule is applied at current time=0.5 (initial value, arbitrary).

$\text{Defect}_{avg}$=average of defect index before the rule i is applied at current time, $\text{Defect}_i$=defect index after the rule i is applied at current time, An example of threshold for rule firing may be 0.7. That is, only rules with effectiveness higher than 0.7 may be selected for firing. Those rules with effectiveness of less than 0.7 may not fire even if the if-part of the rule is satisfied with respect to the real time sensor data and product genealogy data. Briefly, a rule firing refers to executing or activating the THEN part of a rule responsive to the criteria in the conditional part of the rule (IF part) being met.

At 124, based on the ranking produced at 122, n-number of control rules having most effectiveness is selected. The control rules, for example, may include one or more feedback rules. The control rules may also include one or more feed forward rules. An example of a feedback rule includes a rule that sets an operating condition of a current stage. An example of a feed forward rule includes a rule that sets an operating condition of a future stage. For instance, consider for producing product 1, that an intermediary product is being processed at an intermediate stage, e.g., S2 (104); consider also that the operating condition(s) meets a conditional part of a control rule. A feedback rule suggests setting an operating condition at that intermediate stage, e.g., S2 (104). An example of a feedback rule, for example, for stage 2, may specify: If p1.s1.v1>a and p1.s2.v1<b, then set p1.s2.v1=c, where a and b are values for operating condition or feature v1. For instance, if product 1 (or raw or intermediary material for producing product 1) encountered operating condition v1>a at stage 1 and v1<b at stage 2, then the conditional part of this rule is met, and the rules indicates that v1 should be set to value c at stage 2. A feed forward rule suggests setting an operating condition at a later or future stage that follows the current stage. An example of a feed forward rule, for example, at stage 2, may specify: If p1.s1.v1>a and p1.s2.v1<b, then set p1.s3.v1=d. This feed forward rule specifies that if an operating condition or feature v1 at stage S1 is greater than value a, and an operating condition or feature v1 at stage S2 is less than value b, then an operating condition or feature v1 at stage S3 should be set to value d. Those example feedback and feed forward control rules are shown at 126 and 128. A controller 112 actuating an operating condition at stage 2 based on a feedback control rule is shown at 132 in FIG. 1A. A controller 112 actuating an operating condition at stage 2 based on a feed forward control rule is shown at 134 in FIG. 1A.

Feed forward analytics provide mitigation settings (for example, set points or recipes) for downstream processing steps based on processing conditions of upstream processing steps. A feed forward rule may be applicable when the control action has to be ordered in advance of execution, for example, with a positive lead time. For instance, a control execution occurs after a time delay after the action is ordered. An example feed forward rule may include the following:
IF ContinuousCasting.Status="Done" and ContinuousCasting.Temperature<30
   i. and HotRolling.BilletSpeed.Status="Done" and HotRolling.BilletSpeed<18.0
   ii. and ColdRolling.Status="Unstart"
THEN action (REST, URL, (ColdRolling.Backload=180) @HTTP Header)

Feedback Analytics provide mitigation settings (for example, set points or recipes) for current processing steps based on processing conditions of upstream processing steps. A feedback rule may be applicable only when the control action can be carried out instantly at the current processing step. For instance, a control execution occurs without any time delay when the action is ordered.

At 130, the control rules selected at 124 are instantiated with real time sensor detected data. For instance, the real-time manufacturing operating condition data received and stored in the database at 114 are fed into the control rules, and one or more of the control rules are fired or executed if the real-time manufacturing operating condition data meet the conditional part of the control rules. Responsive to the firing of a control rule (meeting the IF clause of the rule causes the THEN part of the rule to activate), a controller or an actuator at 112 is engaged. The controller or the actuator at 112 automatically controls or actuates the operating setting suggested in the THEN part of the rule. For instance, if the THEN part of the rule that is fired specifies that a temperature (operating condition or feature) should be set to X degrees Kelvin at stage 2, the controller (or actuator) automatically changes the thermostat setting of stage 2 in the manufacturing process to X degrees.

FIG. 1C-1, FIG. 1C-2, and FIG. 1C-3 show machine learning and outputs of the machine learning. The figures at 140 show a list of process variables with an order of importance. A subset of variables with high values of importance numbers are chosen to develop a decision tree model. The figure at 142 and 144 show two different illustrations of example resulting decision trees in graphical format. The figure at 146 shows a text representation of a resulting decision tree.

In one embodiment, the processing shown at FIG. 1A and the processing shown at FIG. 1B may be performed in parallel, for instance, continually. For instance, the learning and generation of control rules may occur periodically with additional real time data received from the IoT connectivity messaging platform.

Figure 2:
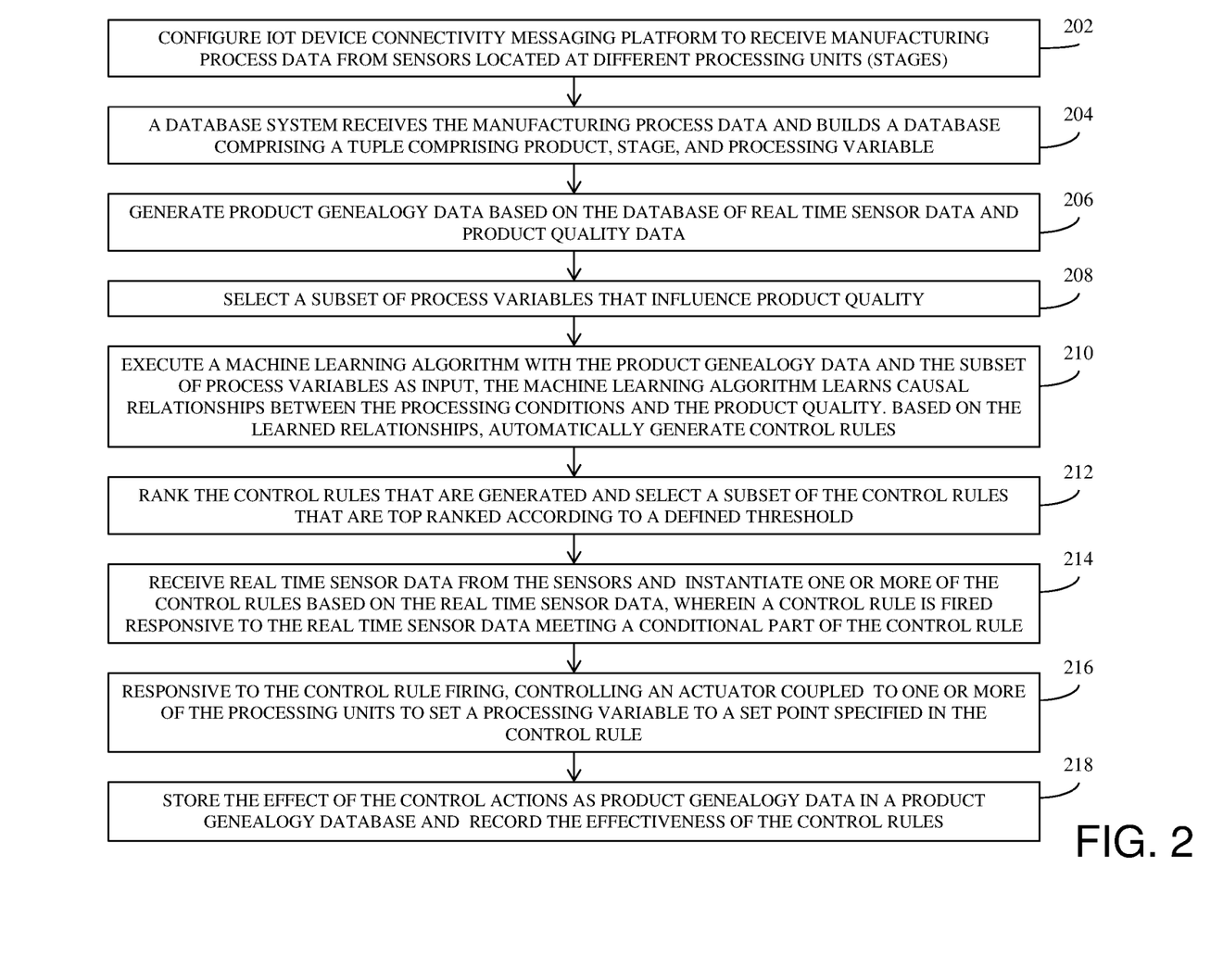
FIG. 2 is a flow diagram illustrating a method of the present disclosure in one embodiment.

FIG. 2 is a flow diagram illustrating a method of the present disclosure in one embodiment. At 202, an IoT device connectivity messaging platform is configured to receive manufacturing process data from sensors located at different stages in multi-stage manufacturing process. For example, in multi-stage manufacturing, different stages or stage areas are set for processing material to produce a product. Each stage area may be equipped with sensors and devices that set and detect operating conditions at the stage. For example, a manufacturing facility may have processing units that process material or intermediary product to produce a final or end product. A stage for example corresponds to a processing unit. Each processing unit may have one or more sensors coupled to the processing unit and measure process variables. Examples of processing units may include blast furnace, hot rolling and cold rolling in a steel manufacturing process. Examples of sensors coupled to a processing unit may include thermocouple, pressure measurement gauge, and flow rate meter.

The IoT device connectivity message platform is configured to communicate with those sensors at all stages to receive real-time operating condition data of a stage when a product is being processed at that stage, for all stages and all operating conditions, and for all products that are manufactured by the multi-stage manufacturing process. For instance, the IoT connectivity messaging platform is configured to control and receive the real time sensor data from the sensors at every specified interval of time, for example, continuously.

At 204, a database system receives the manufacturing process data and builds a database comprising a tuple comprising product, stage, and processing variable. A processing variable represents an operating condition such as temperature, pressure, flow rate, chemical content, and/or others. The operating conditions may pertain to the product (material of the product) itself and also to a condition within a processing unit (for example, temperature of the product material itself, or for example, temperature inside a processing unit. The database also includes product quality data, for example, represented as a tuple comprising a product identifier and quality measure of the product identified by the product identifier.

At 206, product genealogy data is generated based on the database of real time sensor data and product quality data. The product genealogy data specifies a product's history of its manufacturing process (processing conditions), for example, what stages or processing units a product went through to get manufactured, the operating conditions of those stages (process variables), and the product's quality.

At 208, a number of process variables (operating or processing conditions) of production stages that influence the product quality are selected. The process variables may be selected from the process variables specified in the product genealogy data. Examples of process variables may include temperature, pressure, flow rate, and chemical content. The selection may be based on expert knowledge. In another aspect, machine learning for feature selection may be employed to determine which process variables should be selected (as shown in 140).

At 210, the selected process variables and the genealogy data (e.g., received) are input to a machine learning algorithm such as a decision tree algorithm. The decision tree algorithm learns causal relationships between the process variables (processing or operating conditions) of all production stages and the product quality measure. Decision tree is a type of machine learning model which includes a mathematical expression of predicting a response variable (also called dependent variable) in terms of state variables (also called independent variables) and coefficients for state variables. The learning of machine learning model (for example decision trees) includes computing the coefficients using the historic processing data (also called training data or historian data).

Based on the learned relationships, control rules are automatically generated. The generated control rules may include feedback rules and feed forward rules. For example, each branch of a decision tree can be captured as a control rule as shown in 146. A computer by executing computer instructions to separate a branch as a control rule, may automatically generate control rules based on the branches of a decision tree that is learned by a machine autonomously.

The automatically generated control rules provide processing set points (values for operating or processing conditions for one or more production or manufacturing stages) for one or more stages in the multi-stage manufacturing process so that the desired product quality is obtained. The control rules may be also referred to as quality control rules.

At 212, the automatically generated quality control rules may be further filtered to include a subset that are determined to be most effective in improving the end product quality. This selection or filtering may be performed by applying those rules during a multi-stage manufacturing process and evaluating or measuring the end product's quality. The n-number of control rules that were applied in producing products with higher product quality is selected. In one aspect, the control rules that are applied during a manufacturing process that produced a product having a quality value that exceeds a defined threshold value, may be selected. For example, the control rules that are generated are ranked and a subset of the control rules that are top ranked according to a defined threshold is selected.

At 214, the subset of the quality control rules is instantiated. The subset includes those control rules determined to be (or filtered at 212) most effective in producing a quality product (e.g., those that have a quality measure that exceeds a threshold quality value). Instantiation, for example, includes feeding into those selected control rules, the real time data that is being received at the IoT connectivity messaging platform, for example, and processed in the database. Instantiation of control rules may also include feeding into the rules the historical product genealogy data, for example, for those rules that test past processing stage data. When the real time sensor data (and e.g., the historical product genealogy data, depending on the conditional part of the control rule) meet the control rule's conditional part, the control rule will fire, signaling to control a process variable (processing condition) set point at a stage. An example of a control rules may include, for example, at stage 2, if $p1.s1.v1>a$ and if $p1.s2.v1<b$ for defined values a and b, then $p1.s2.v1=c$. So, for example, if product 1 is being processed at stage 2, and its processing variable v1 at stage 1 had a value greater than a, and the processing variable v1 of product 1 currently at stage 2 is less than value b, the control rule files, signaling to set or control the processing variable v1 of product 1 at stage 2 to value c.

At 216, responsive to the firing of the control rule, a control action to set the processing variable to a set point determined or specified by the rule is sent or transmitted to a controller, which controls a sensor or device at the corresponding stage or coupled to the processing unit to physically set the processing variable (also referred to an operating condition) to the value determined by (specified in) the control rule that fired. For example, the control actions (feedback and/or feed forward rule or rules) are sent to a process controller, process advisory system and/or actuator to implement the control action.

At 218, the effect of the control actions are stored as product genealogy data in a product genealogy database and the effectiveness of the control rules are recorded.

Figure 3:
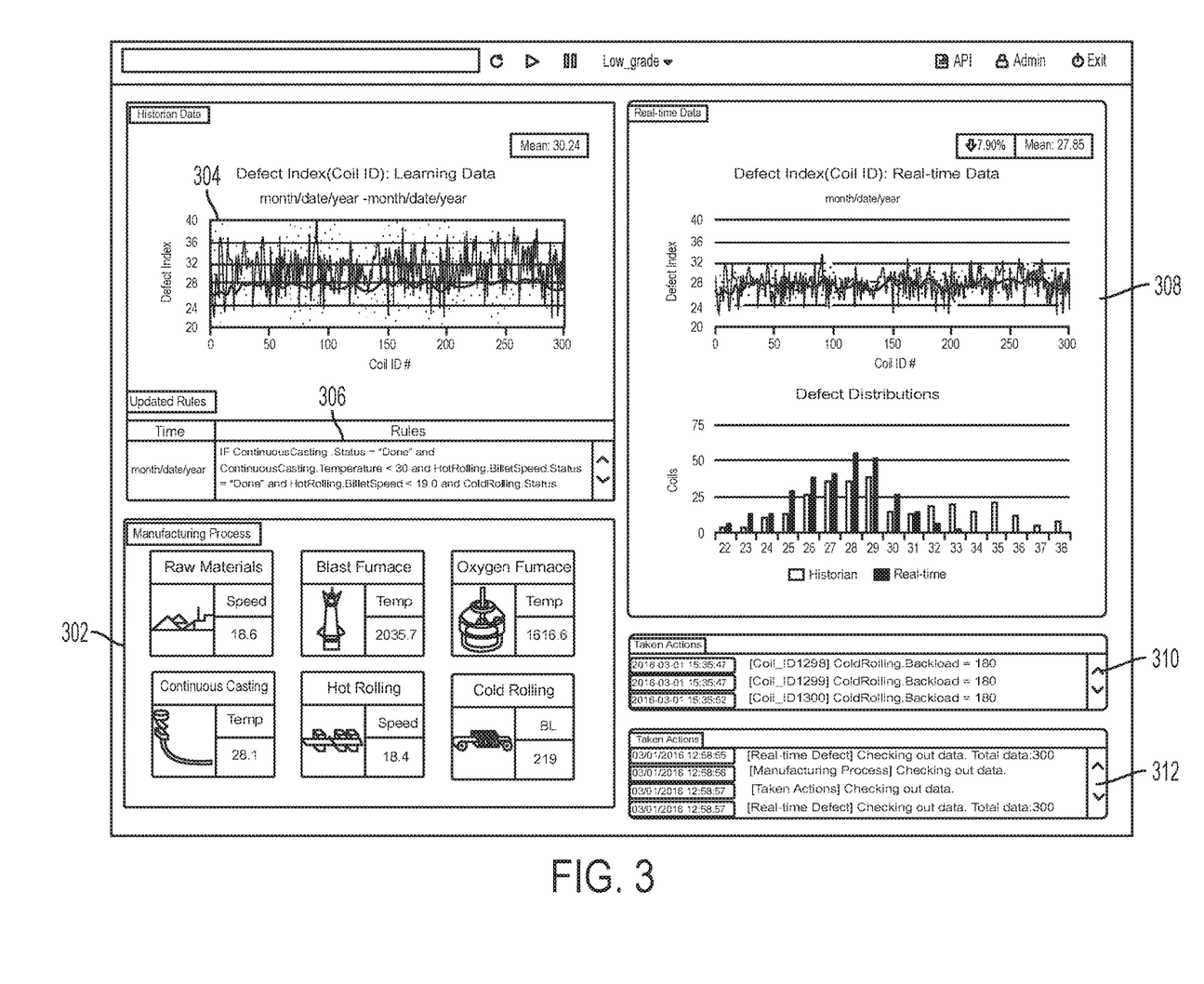
FIG. 3 shows an example user interface display showing product manufacturing process with instantiation of control rules based on real time IoT sensor data that may actuate changing or controlling one or more set points, in one embodiment of the present disclosure.

FIG. 3 shows an example user interface display showing product manufacturing process with instantiation of control rules based on real time IoT sensor data that may actuate changing or controlling one or more set points, in one embodiment of the present disclosure. A display panel at 302 shows six stages in multi-stage manufacturing process. In this example, stages include raw material processing at a raw material processing unit, processing at blast furnace, processing at oxygen furnace, continuous casting at another casting unit, hot rolling at hot rolling unit, and cold rolling at cold rolling unit. Historical defect index is shown at 304 and shows defect information (product quality) input to a machine learning algorithm to learn causal relationships between process variables (processing conditions) and defects (product quality) in a product. Rules that are generated based on the causal relationships are shown at 306. The display panel at 308 shows real time defect index (product qualify information) that results after applying one or more control rules, which automatically causes actuation of set points in one or more stages (processing units) in real time. The display panel at 310 shows the control actions (actuations) that are automatically taken, based on applying the control rules in real time. The display panel at 312 shows log data.

In one embodiment, the automated or autonomous learning of the control rules are performed on-line and the control rules are integrated into the process control of manufacturing process. The on-line rules are automatically or autonomously adjusted based on their effectiveness, for example, those that have effectiveness that exceed a defined threshold effectiveness may be selected for instantiation. The control rules may be instantiated in real time based on both real time data (e.g., real time IoT sensor data) and historic product genealogy data.

Figure 4:
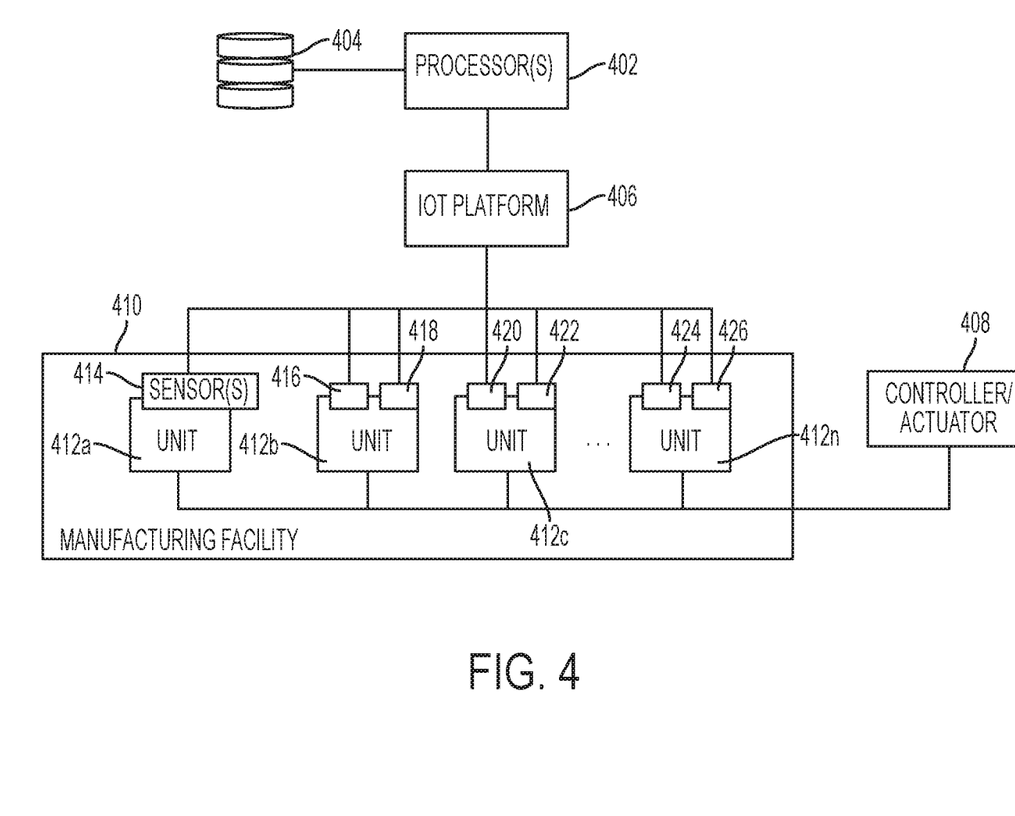
FIG. 4 is a diagram illustrating system components in one embodiment of the present disclosure.

FIG. 4 is a diagram illustrating system components in one embodiment of the present disclosure. A hardware processor 402 is coupled to a storage device 404. The storage device 404 stores product genealogy data, for example, in a database system or via another repository mechanism. The product genealogy data specifies history of processing conditions at all stages (e.g., at 412a, 412b, 412c, 412n) in the multi-stage manufacturing process in manufacturing a product, for example, for multiple products. The processing conditions may be expressed and stored in terms of process variables and corresponding values measured by sensors. The sensors (e.g., 414, 416, 418, 420,422, 424, 426 . . . ) are coupled to processing units (e.g., 412a, 412b, 412c, 412n) in a manufacturing facility 410 implementing the multi-stage manufacturing process, the hardware processor 402 receiving the product genealogy data. The genealogy data also include the product quality data. The hardware processor 402 selects a subset of process variables that influence product quality, from the process variables, and the hardware processor 402 executes a machine learning algorithm with the product genealogy data and the subset of process variables as input. The machine learning algorithm learns causal relationships between the processing conditions and the product quality. Based on the learned causal relationships, the hardware processor automatically generates control rules for controlling process variable set points at one or more stages (e.g., at 412a, 412b, 412c, 412n) in the multi-stage manufacturing process, for example, to improve the quality of a product being manufactured. The hardware processor 402 may receive real time sensor data transmitted by the sensors and instantiates one or more of the control rules based on the real time sensor data. Responsive to the real time sensor data meeting a conditional part of a control rule, a control rule is fired. Responsive to the control rule firing, the hardware processor 402 controls (for example, sends a signal to control) an actuator 408 coupled to one or more of the processing units (e.g., 412a, 412b, 412c, 412n) to set a processing variable to a set point specified in the control rule.

In one embodiment, the hardware processor 402 configures an IoT connectivity messaging platform 406 to control and receive the real time sensor data from the sensors (e.g., 412a, 412b, 412c, 412n) at every specified interval of time continuously. In one embodiment, the IoT platform 406 may be cloud-based platform.

Figure 5:
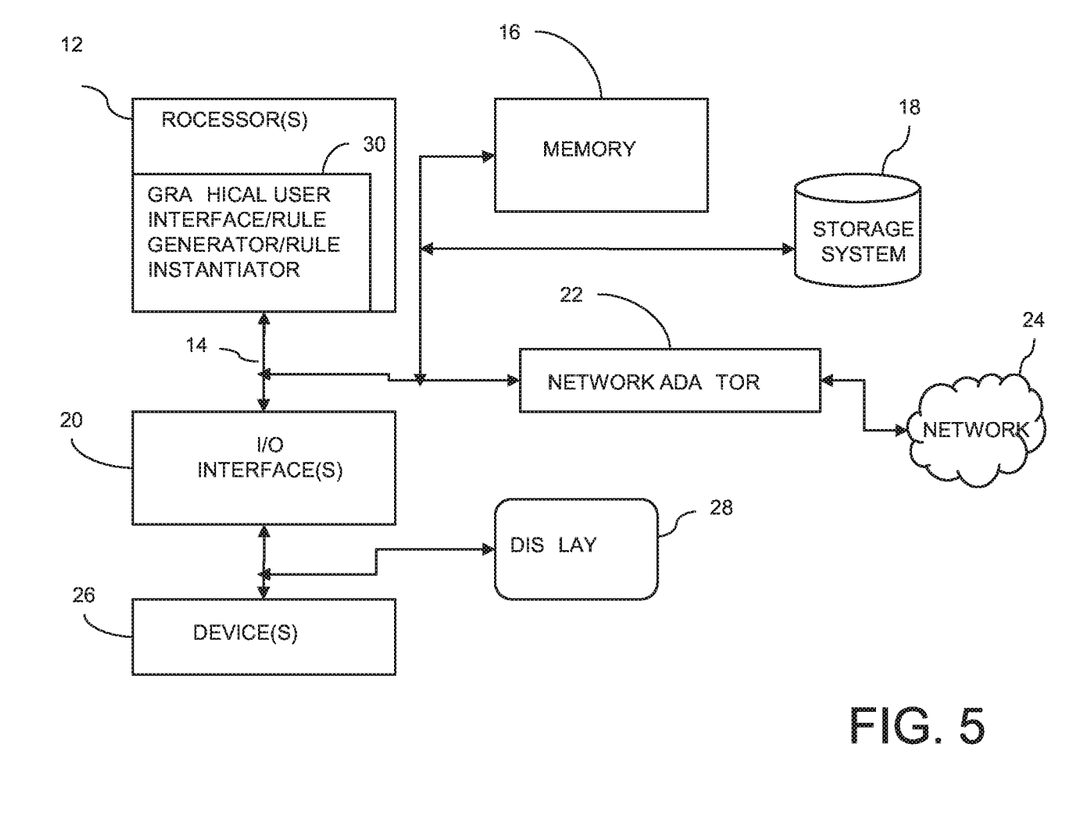
FIG. 5 illustrates a schematic of an example computer or processing system that may implement a manufacturing process control system in one embodiment of the present disclosure.

FIG. 5 illustrates a schematic of an example computer or processing system that may implement a manufacturing process control system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system of controlling product production in multi-stage manufacturing process, comprising:
   a hardware processor;
   a memory device operatively coupled to the hardware processor;
   the hardware processor operable to at least:
      receive data indicative of a history of processing conditions at stages in the multi-stage manufacturing process in manufacturing a product, the processing conditions expressed in terms of process variables and corresponding values measured by sensors operatively coupled to processing units in a manufacturing facility implementing the multi-stage manufacturing process;
      select a subset of process variables that influence product quality, from the process variables;
      run a machine learning algorithm with the data and the subset of process variables as input, the machine learning algorithm outputting causal relationships between the processing conditions and the product quality;
      automatically generate a control rule based on at least one of the causal relationships, the control rule for controlling a process variable set point at a stage in the multi-stage manufacturing process;
      receive real time sensor data; and
      instantiate the control rule based on the real time sensor data, wherein the control rule is fired responsive to the real time sensor data meeting a conditional part of the control rule, wherein the control rule includes at least a rule to set an operating condition at a future manufacturing process stage that follows a current manufacturing process stage.

2. The system of claim 1, wherein the hardware processor is further operable to, responsive to the control rule firing, controlling an actuator coupled to at least one of the processing units to set a processing variable to a set point specified in the control rule.

3. The system of claim 1, wherein the control rule comprises a plurality of control rules, wherein the hardware processor is further operable to rank the control rules based on effectiveness.

4. The system of claim 3, wherein the hardware processor is further operable to select a subset of the control rules that are top ranked according to a defined threshold.

5. The system of claim 4, wherein the control rule that is instantiated is in the top ranked subset.

6. The system of claim 1, wherein the hardware processor is further operable to configure an Internet of Things (IoT) connectivity messaging platform to control and receive the real time sensor data at specified interval of time.

7. A computer program product comprising a computer readable storage medium having program instructions embodied therewith, the program instructions readable by a processor to cause the processor to at least:
   receive data indicative of a history of processing conditions at stages in the multi-stage manufacturing process in manufacturing a product, the processing conditions expressed in terms of process variables and corresponding values measured by sensors operatively coupled to processing units in a manufacturing facility implementing the multi-stage manufacturing process;
   select a subset of process variables that influence product quality, from the process variables;
   training a machine learning algorithm using at least the data and the subset of process variables, the machine learning algorithm learning causal relationships between the processing conditions and the product quality and trained to output a control rule based on at least one of the causal relationships, the control rule for controlling a process variable set point at a stage in the multi-stage manufacturing process,
   wherein the control rule includes at least a rule to set an operating condition at a future manufacturing process stage that follows a current manufacturing process stage.

8. The computer program product of claim 7, wherein the processor is further caused to receive real time sensor data and instantiate the control rule based on the real time sensor data.

9. The computer program product of claim 8, wherein the processor is further caused to, responsive to the control rule firing, control an actuator coupled to at least one of the processing units to set a processing variable to a set point specified in the control rule.

10. The computer program product of claim 8, wherein the hardware processor is further operable to configure an Internet of Things (IoT) connectivity messaging platform to control and receive the real time sensor data at specified interval of time.

11. The computer program product of claim 10, wherein the machine learning algorithm is retrained based on the received real time sensor data.

12. The computer program product of claim 7, wherein the control rule comprises a plurality of control rules, wherein the hardware processor is further operable to rank the control rules based on effectiveness.

13. The computer program product of claim 12, wherein the hardware processor is further operable to select a subset of the control rules that are top ranked according to a defined threshold.

14. The computer program product of claim 13, wherein the processor is further caused to receive real time sensor data and instantiate the control rule based on the real time sensor data, wherein the control rule that is instantiated is in the top ranked subset.

15. A method comprising:
   receiving data indicative of a history of processing conditions at stages in the multi-stage manufacturing process in manufacturing a product, the processing conditions expressed in terms of process variables and corresponding values measured by sensors operatively coupled to processing units in a manufacturing facility implementing the multi-stage manufacturing process;

selecting a subset of process variables that influence product quality, from the process variables;

training a machine learning algorithm using at least the data and the subset of process variables, the machine learning algorithm learning causal relationships between the processing conditions and the product quality and trained to output a control rule based on at least one of the causal relationships, the control rule for controlling a process variable set point at a stage in the multi-stage manufacturing process, wherein the control rule includes at least a rule to set an operating condition at a future manufacturing process stage that follows a current manufacturing process stage.

16. The method of claim 15, further comprising:
receiving real time sensor data; and
instantiating the control rule based on the real time sensor data.

17. The method of claim 16, further comprising, responsive to the control rule firing, causing controlling of an actuator coupled to at least one of the processing units to set a processing variable to a set point specified in the control rule.

18. The method of claim 16, further comprising:
configuring an Internet of Things (IoT) connectivity messaging platform to control and receive the real time sensor data at specified interval of time.

19. The method of claim 18, further comprising:
retraining the machine learning algorithm i based on the received real time sensor data.

20. The method of claim 15, wherein the control rule comprises a plurality of control rules, wherein the hardware processor is further operable to rank the control rules based on effectiveness.

* * * * *